United States Patent [19]

Drexhage

[11] 3,878,478

[45] Apr. 15, 1975

[54] MODE-LOCKING GIANT PULSE LASERS

[75] Inventor: Karl H. Drexhage, Rochester, N.Y.

[73] Assignee: Eastman Kodak Company, Rochester, N.Y.

[22] Filed: July 25, 1973

[21] Appl. No.: 382,416

[52] U.S. Cl. ........................................ 331/94.5 ML
[51] Int. Cl. ............................................... H01s 3/10
[58] Field of Search ................................... 331/94.5

[56] References Cited
UNITED STATES PATENTS
3,743,964  7/1973  Drexhage et al................... 331/94.5
FOREIGN PATENTS OR APPLICATIONS
2,107,958  12/1972  France .............................. 331/94.5

OTHER PUBLICATIONS

Drexhage et al., New Q–Switch Compounds for Infrared Lasers, IEEE J. Quant. Elect., Vol. QE–8, No. 9 (Sept. 1972), pg. 759.

*Primary Examiner*—William L. Sikes
*Attorney, Agent, or Firm*—R. P. Hilst

[57] ABSTRACT

Mode-locking giant pulse infrared lasers may be accomplished using a saturable absorption media comprising as a saturable dye a transition metal dithiene complex dissolved in a solvent medium containing an electronically active organic solvent. Suitable electronically active organic solvents include organic solvents containing an atom having an atomic weight greater than about 50, a sulfur atom-containing organic solvent, and an N-heterocyclic ring-containing organic solvent.

8 Claims, 4 Drawing Figures

MODE-LOCKING GIANT PULSE LASERS

FIELD OF THE INVENTION

The present invention relates to giant-pulse infrared lasers and the generation of a train of discrete, high-power, short duration, light pulses from such lasers, usually referred to as mode-locking the laser.

RELATED ART

Recently, substantial interest and research effort have been directed to the development of means for controlling and regulating the output of lasers such as the neodymium-glass laser and ruby laser to obtain a giant-pulse laser. One especially convenient means for regulating the output of such lasers has been the development of various saturable absorption media known in the art as Q-switching dye solutions.

Q-switching dye solutions are materials whose absorption coefficient for the emitted laser light decreases as the light intensity is increased. In theory, it is believed that when the molecules and/or atoms of the saturable dye absorber are excited from a first energy level to a second energy level by the emitted light from the laser, the dye absorber undergoes a decrease in light absorption changing from a substantially opaque state to a substantially transparent state.

Many Q-switching dye solutions are presently available for use with lasers such as the ruby lasers. However, only a very small number of Q-switching dye solutions have been developed to date for use with various infrared lasers such as the neodymium-glass laser. This reflects the fact that only a minority of organic compounds exhibit strong electronic absorption in the infrared region of the spectrum. Moreover, most of the compounds which are known to exhibit strong electronic absorption in the infrared region belong to the cyanine class of compounds and many of these materials are known to deteriorate rapidly under irradiation. Among the various dyes which have been developed for Q-switching infrared lasers are certain cyanine dyes described in U.S. Pat. No. 3,470,492 issued Sept. 30, 1969, the pyrylium dyes described in U.S. Pat. No. 3,417,083, issued Dec. 17, 1968, and more recently, the metal dithiene complexes described in French Pat. No. 2,107,958, dated Dec. 5, 1972.

In a conventional lasing apparatus such as a neodymium-glass laser, coherent, substantially monochromatic pulses of light are produced. Briefly, this occurs using laser apparatus as follows: The typical laser includes a lasing means such as a glass rod doped with a primary additive to provide active ions, for example, a neodymium-glass rod positioned in an optical cavity (or resonator as it is sometimes called) defined by reflective end coatings or mirrors positioned at the ends of the rod. A pumping energy source, such as a xenon or argon arc flash tube or an arc discharge tube containing only air or other gaseous mixtures, is operably coupled to the lasing means. To activate the laser, energy, for example, light energy, is pumped into the laser means from the pumping energy source to stimulate a population inversion between two energy levels of the laser ions. When a given threshold or inverted state is obtained, a radiative emission of energy from the rod will occur. This stimulated emission is effectively generated by light cycling back and forth within the optical cavity through the lasing means. The emitted light is of a frequency corresponding to the energy difference between the two energy levels. The stimulated energy emission generated when the inverted population tends to return to its original energy level may be released from the system in the form of external laser emission or pulse by making one of the end coatings or mirrors partially reflective.

To convert the above-described laser to a giant-pulse laser, one simply inserts a light-switching means, such as the above-described Q-switching dye solutions, within the optical cavity of the laser. This light-control means essentially lowers the Q, i.e., the figure of merit, of the optical cavity by blocking light to permit a much greater inverted population level to be achieved by the laser means before stimulated emission takes place.

By using a saturable absorption media having the foregoing characteristics in the optical cavity of the giant-pulse laser, laser action will be inhibited because of the high absorption of the media in the absence of a sufficient amount of incident light of laser frequency, thus providing a substantially opaque optical element in the optical cavity. The Q of the optical cavity is thus lowered. As optical energy is continuously pumped into the lasing means, however, there will be sufficient initial laser action to produce excitation of the molecules or atoms in the saturable absorption media so that it tends toward transparency. As the saturable absorption media becomes more transparent, the Q of the optical cavity increases resulting in more incident laser light on the lasing means so that the process is regenerative. In an extremely short time a complete change in state of the saturable absorption media to a condition of transparency will occur. At this point, a giant pulse will be released. Upon release of the laser pulse, the saturable absorption media will resume its initial condition in which it is substantially opaque.

As noted above, Q-switching dye solutions have been found effective for converting conventional lasers into the so-called giant-pulse lasers. However, because of increased interest in the many uses for optical pulses having an extremely high peak power and extremely short duration, additional research and development activity has focused on modifying the pulse output of the giant-pulse lasers to provide a train of laser pulses having high peak power on the order of at least about $10^7$ watts and short duration. In essence, the attempt has been to convert the output of giant-pulse lasers, which tend to emit light pulses having a relatively long duration on the order of about 20 nanoseconds or more into a train of high-power, short duration pulses. This is referred to as mode-locking the giant-pulse laser.

To achieve complete mode-locking of a giant-pulse laser using a saturable absorption medium, the recovery time of the dye absorber must be extremely rapid. The recovery time of the dye is the time required for the dye molecules to return from the excited or transparent state to the absorptive or opaque ground state. To obtain full or complete mode-lock operation, i.e., emission of a train of high-power, short duration pulses, the Q-switching dye solution must have a recovery time similar to the pulse duration time.

SUMMARY OF THE INVENTION

In accord with the present invention, there is provided an infrared giant-pulse laser apparatus containing an improved saturable absorption media having an absorption peak within the range of about 700 nm. to about 2500 nm. comprising as a saturable dye a transition metal dithiene complex dissolved in a solvent for said complex. The improvement of the present invention is obtained by using as the solvent in said saturable absorption media an amount of an electronically active organic solvent sufficient to mode-lock the output of the giant-pulse laser. As a result, one obtains a train of discrete high-power infrared light pulses from such lasers. These pulses have a duration of less than about 0.5 nanoseconds.

The electronically active organic solvent used in the present invention may be selected from, among others, organic solvents containing an atom having an atomic weight greater than about 50, organic solvents having a sulfur-containing substituent, and N-heterocyclic ring-containing organic solvents.

DESCRIPTION OF THE PREFERRED EMBODIMENTS

The saturable dye solutions of the present invention provide several advantages. Among these advantages is the fact that these solutions contain a metal dithiene complex which has been found to be extremely stable and capable of repeated Q-switching and mode-lock operations. This is of considerable advantage because, as noted earlier herein, most of the compounds presently available for Q-switching lasers having an output in the infrared portion of the spectrum, for example, the cyanine dyes, tend to deteriorate under repeated use.

A second advantage provided by the present invention is the discovery that, by use of the saturable absorption media described herein, Q-switching and complete mode-locking of giant-pulse infrared lasers is obtained. It may be noted that although Q-switching has previously been obtained in infrared lasers such as the neodymium-glass laser using the metal dithiene complexes described herein, complete mode-lock operation using these dyes has, to applicant's knowledge, never before been achieved. In this regard, reference is made to the paper entitled "New Q-Switch Compounds for Infrared Compounds for Infrared Lasers" by K. H. Drexhage and U. T. Muller-Westerhoff appearing in *IEE Journal of Quantum Electronics*, Volume QE-8, No. 9, September, 1972, at page 759, and French Pat. No. 2,107,958, dated Dec. 5, 1972, at page 8.

Figures 1A, 1B, 1C:
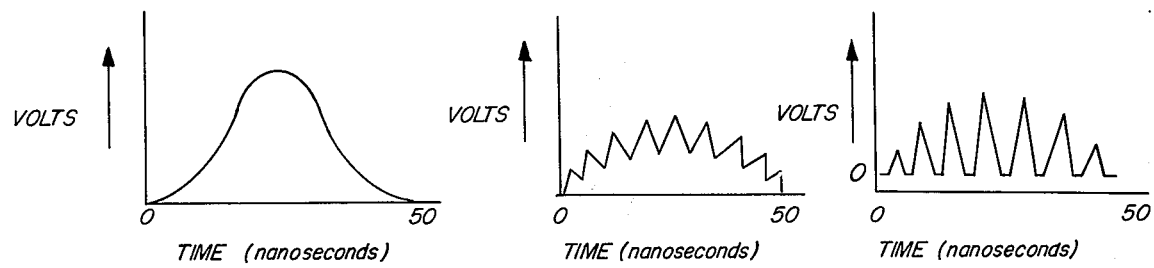
FIG. 1a–1c represent graphs illustrating the difference among conventional Q-switch giant-pulse laser output, partially mode-locked giant-pulse laser output, and completely mode-locked giant-pulse laser output, respectively.

The difference between partial mode-locking and complete mode-locking as obtained in accordance with the present invention may be illustrated with reference to FIG. 1a through 1c of the attached drawing. These figures represent graphically the trace obtained on an oscilloscope from a giant-pulse neodymium-glass laser operating respectively in a conventional Q-switch mode (FIG. 1a), a partial mode-locking mode (FIG. 1b), and complete mode-locking (FIG. 1c) of the present invention. As illustrated in FIG. 1a and 1b, using conventional solvents of the type heretofore used with the metal dithiene complexes, one obtains either a conventional Q-switch output in the form of a single giant pulse of about 20 nanoseconds duration (see FIG. 1a) or, at best, partial mode-locking (as illustrated in FIG. 1b) wherein the laser output traced on the oscilloscope is in the form of a single pulse having a series of individual peaks. In contrast, in accordance with the present invention, one obtains a laser output as shown in FIG. 1c wherein complete mode-locking is achieved as indicated by the train of separate and discrete, short, high-power pulses. As used in the present specification, and as is conventional in the laser art, pulse duration times are the half-width pulse duration times.

Figure 2:
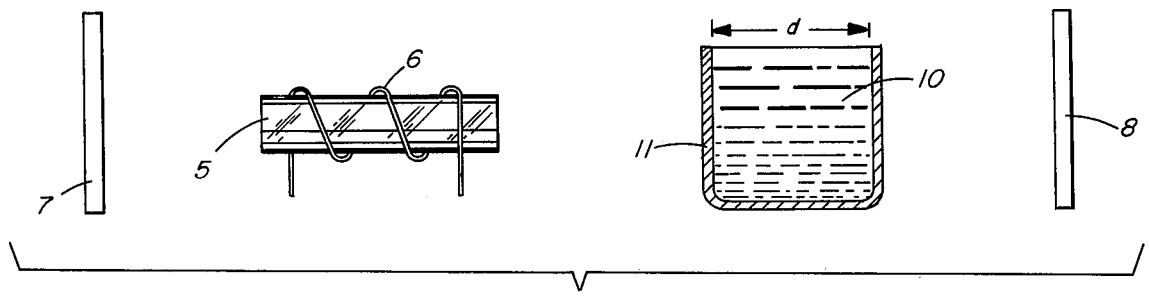
FIG. 2 represents schematically laser apparatus including the saturable absorption media of the present invention.

FIG. 2 is a schematic representation of a giant-pulse laser apparatus incorporating the saturable absorption media light-control means used in the present invention. In FIG. 2, lasing means 5 represents a typical high-power infrared laser element such as neodymium ($Nd^{+3}$) doped glass rod and 6 is the pumping energy source which is coupled to lasing means 5. A typical pumping energy source is a xenon or argon arc flash lamp. 7 and 8 are reflective surfaces spaced apart from either end of lasing means 10 to define the optical cavity of the laser apparatus. In a typical operation or configuration, reflective surface 7 reflects all the radiation emitted by lasing means 5, preferably exhibiting 100% reflectance. Reflective surface 8 is partially reflective and partially transmissive of the radiation emitted by lasing means 5. The particular degree of transmission depends on the length of the optical cavity defined by lasing means 5 and reflective surfaces 7 and 8, the particular type of pulse emission desired, and other factors within the skill of those familiar with the lasing art. The optical cavity of the laser apparatus illustrated in FIG. 2 should be designed for potential mode-locking which means, as is known in the art, that internal reflections within the cavity are substantially eliminated by arranging all optical surfaces within the cavity at Brewster's angle. Positioned within the apparatus of FIG. 2 is light-control means containing the saturable absorption media 10 used in the present invention. Typically, the light-control means comprises an infrared transparent cell or envelope 11 made from infrared transparent material such as glass or a plastic such as poly(methyl methacrylate) or poly(styrene). A typical cell has an internal thickness d of about 1mm. which is filled with the saturable absorption media 10.

The metal dithiene complexes useful in the invention have the general formula:

I 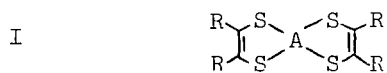

wherein A represents a transition metal selected from Group VIII of the Periodic Table of the Elements, and R represents an aromatic group including substituted and fused aromatic ring groups.

Typical of the metal dithiene complexes useful in the present invention are materials having the following formula:

II 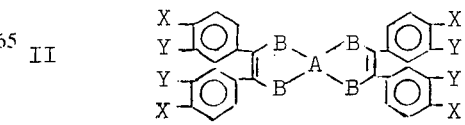

wherein:

A represents a transition metal atom such as nickel, palladium or platinum;

B represents sulfur, oxygen, selenium or:

$$>N-H$$

group;

X represents an hydroxy group, a lower alkoxy or lower alkyl group containing from 1 to about 5 carbon atoms, or an amine having the formula $-NR_2$ wherein R represents hydrogen or a lower alkyl as defined above, and, when taken together with Y, represents the necessary nonmetallic atoms to form a fused 5- or 6-member ring, preferably a carbocyclic or oxygen heterocyclic ring; and Y represents hydrogen, a lower alkoxy or lower alkyl group as defined above, or, when taken together with X, represents a fused ring group as specified above.

Specific transition metal dithiene complexes representative of those which may be used in the saturable absorption media used in the present invention are complexes having the following formulas:

III.

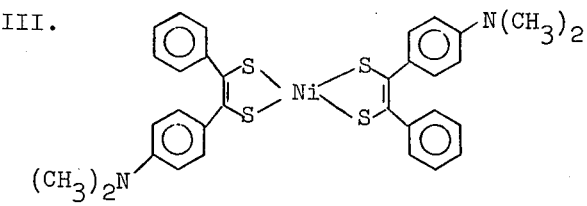

IV.

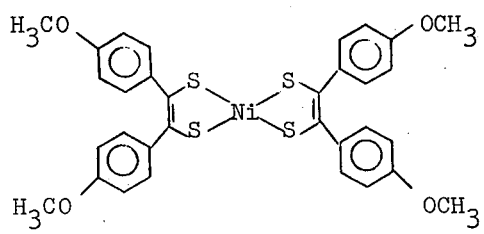

V.

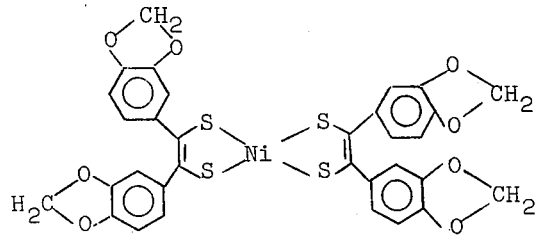

VI.

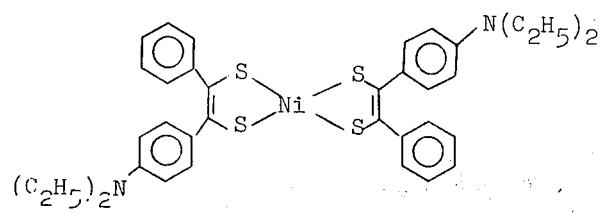

Especially good results have been obtained using a dye having Formula II hereinabove wherein A is nickel and B is sulfur.

The method of preparing the transition metal complexes of the general type described herein is set forth in the article entitled "Concerning the Synthesis of Dithio-α-diketone Complexes of Transition Metals from Thiophosphates of 1,2-Dithiole", *Inorganic Chemistry*, Schrauzer et al., Vol. 4, No. 11, Nov. 1965, pp. 1615–1617. Specific preparative methods for certain of the preferred nickel complexes may be found in French Pat. No. 2,107,958, and the article by Drexhage and Muller-Westerhoff noted above.

The solvent medium used in the present invention comprises a sufficient amount of an electronically active organic solvent for the metal dithiene complexes to mode-lock the laser. Typically, the electronically active solvent comprises at least about 50% by weight of the solvent medium for the dye complex. Electronically active solvents which have been found particularly useful in the present invention include (1) "heavy atom"-containing organic solvents, i.e., organic solvents containing at least one atom in their molecular structure having an atomic weight in excess of 50, (2) sulfur atom-containing organic solvents, i.e., organic solvents containing at least one sulfur atom substituent in their molecular structure, (3) nitrogen heterocyclic ring-containing organic solvents, i.e., organic solvents containing a nitrogen heterocyclic ring in their molecular structure, and (4) mixtures of (1)–(3).

Representative of typical heavy atom -containing solvents are the iodine- and bromine-substituted lower alkanes containing 1 to about 5 carbon atoms, for example, bromomethane, iodomethane, iodoethane, bromoethane, dibromoethane, 1-iodobutane, diiodomethane and 1,5-diiodopentane; the iodine- and bromine-substituted aromatic solvents such as the benzenes and naphthalenes, for example, bromobenzene, iodobenzene, o-dibromobenzene, o-diiodobenzene, o-iodotoluene and 1-iodonaphthalene; and various other heavy atom-containing solvents.

Representative of typical sulfur-containing organic solvents are the sulfoxides including the alkyl sulfoxides having 1 to about 6 carbon atoms in the alkyl group, such as methyl sulfoxide, n-propyl sulfoxide, tetramethylene sulfoxide and the like; the sulfides including the alkyl and cycloalkyl sulfides having 1 to about 6 carbon atoms in the alkyl group such as ethyl sulfide, propylene sulfide, and tetrahydrothiophene; the aryl sulfides such as phenyl sulfide; and other sulfur-containing organic solvents.

Representative of typical nitrogen heterocyclic ring-containing organic solvents are organic solvents containing a 6-to 10-member nitrogen heterocyclic ring, including a fused heterocyclic ring, in their molecular structure, such as pyridines including pyridines having one or more aliphatic substituents containing 1 to about 6 carbon atoms in the aliphatic group, for example, 4-methylpyridine, 2,5-dimethylpyridine, 3,4-dimethylpyridine, 4-tert-butylpyridine, etc, and various other nitrogen heterocyclic ring-containing solvents such as quinoline.

The amount of the transition metal dithiene complex contained in the saturable absorption media used in the invention may vary. Typically, a saturable absorption media having a dye concentration within the range of from about $10^{-5}$ molar to about $10^{-3}$ molar is used.

As stated above, the electronically active solvent used in the saturable absorption media described herein typically comprises at least about 50% by weight of the liquid solvent media contained in the saturable absorption media. The remaining solvent, if any, may be selected from a variety of liquid solvent materials for the transition metal complexes, including non-heavy atom solvents such as chloroform, benzene, nitrobenzene, lower alkyl alcohols and the like. It will be understood, of course, that the particular solvent(s) used will depend in any specific case on various factors including the particular transition metal complex chosen, the particular laser output characteristics desired, etc.

In accord with a preferred embodiment of the invention, the solvent media for the saturable absorption media described herein comprises 100% of one or more of the above-described electronically active organic solvents. To date, shorter-duration pulses have generally been achieved when the solvent is made up completely of one or more of the above-noted electronically active solvents.

The specific mechanism(s) by which the saturable absorption media permit complete mode-locking to be obtained in accord with the present invention are not fully understood. However, it is believed that the electronically active solvents employed are interacting in an electronic sense with the transition metal dithiene complexes. In this regard, it is believed that the heavy atom of the heavy atom solvents used herein increases the rate of the crossover of the dye molecules from the excited state, i.e., the "transparent" state, to the ground state, i.e., the "opaque" state, and, therefore, the "window" through which laser output may be emitted is open for only extremely brief periods. Similarly, it is believed that the nitrogen heterocyclic ring-containing solvents and the sulfur-containing solvents interact electronically with the dye molecule, perhaps via a rapid reversible electron transfer from a solvent molecule to the excited dye molecule, to reduce the time required for the dye to recover from the "transparent" state to the ground or opaque state.

The following examples are presented to illustrate the present invention.

Example 1 — Control

The compound bis(4-dimethylaminodithiobenzil) nickel is dissolved in nitrobenzene to an optical density of 0.3 at the wavelength 1060 nm in a cuvette of 1mm thickness. When placed in the laser cavity of a neodymium-glass laser, i.e., Nd-glass laser No. 1010c2 of Spacerays, Inc., the laser emitted a Q-switched pulse at 1060 nm of about 20 nsec. duration.

Example 2

The dye of Example 1 is dissolved in 1-iodobutane to an optical density of 0.3 at the wavelength 1060 nm in a cuvette of 1mm thickness. When placed in the laser cavity of the laser described in Example 1, the laser is mode-locked and emits a train of pulses, each of which is shorter than 0.5 nsec. in duration. The time between the individual pulses is 8 nsec. corresponding to the round-trip time in the optical cavity of the laser. A photograph of an oscilloscope trace of the completely mode-locked laser output produced in Example 2 is obtained using an International Telephone and Telegraph biplanar photodiode Type F4000, with S-1 response, connected to a Tektronix oscilloscope Type 519; using a sweep time of 20 nsec/division. FIG. 1c is a representation of this photograph which shows complete mode-locking as indicated by the train of short discrete pulses that are regularly spaced by about 8 nsec.

Example 3

Example 2 is repeated except that the following list of solvents are used in place of the 1-iodobutane: iodomethane; iodoethane; 1-iodo-2-methylbutane; 1-iodoheptane; 1-iododecane; diiodomethane; pyridine; 4-methylpyridine; 2,5-dimethylpyridine; 3,4-dimethylpyridine; 4-tert-butylpyridine; quinoline; methyl sulfoxide; n-propyl sulfoxide; tetramethylene sulfoxide; ethyl sulfide; propylene sulfide; tetrahydrothiophene; phenyl sulfide. In all cases, complete mode-locking is observed, as shown in FIG. 1c. However, the duration of individual pulses varies depending on the particular solvent.

Example 4 — Control

Example 1 is repeated except that the solvent used is a nonheavy atom solvent of 1,2-dichloroethane. Normal Q-switching without mode-locking is observed. A photograph of an oscilloscope trace of the laser output produced in Example 4 is obtained as described in Example 2. FIG. 1a is a representation of this photograph which shows essentially no mode-locking as evidenced by a single giant-pulse of about 20 nsec. duration.

The invention has been described in detail with particular reference to certain preferred embodiments thereof, but it will be understood that variations and modifications can be effected within the spirit and scope of the invention.

I claim:

1. In a laser apparatus for generating a train of discrete, high-power, short, monochromatic infrared light pulses including an optical cavity, lasing means positioned within said cavity for the production of radiative infrared emission during population inversion thereof, a pumping energy source operably coupled to said lasing means for stimulating the population inversion thereof, and as a light control means a saturable absorption media having an absorption peak within the range of from about 700 nm to about 2500 nm and comprising a transition metal dithiene complex dissolved in a solvent for said complex, said light control means adapted to be positioned within said cavity to control said emission, the improvement wherein said solvent comprises an amount of an electronically active organic solvent for said complex sufficient to convert the infrared emission of said laser into a train of discrete, high-power, infrared pulses, each pulse having a duration of less than about 0.5 nanoseconds, said electronically active organic solvent selected from the group consisting of an organic solvent containing an atom having an atomic weight greater than about 50, a sulfur atom-containing organic solvent, and an N-heterocyclic ring-containing organic solvent.

2. A laser apparatus as defined in claim 1 wherein said electronically active organic solvent is an iodine-substituted organic solvent.

3. A laser apparatus as defined in claim 2 wherein said solvent consists essentially of an electronically active organic solvent for said complex.

4. A saturable absorption media for use in Q-switching and mode-locking an infrared laser apparatus, said media having an absorption peak within the range of from about 700 nm to about 2500 nm and comprising a transition metal dithiene complex dissolved in a solvent comprising at least about 50% by weight of an electronically active organic solvent selected from the group consisting of an organic solvent containing an atom having an atomic weight greater than about 50, a sulfur atom-containing organic solvent, and an N-heterocyclic ring-containing organic solvent.

5. A saturable absorption media as defined in claim 4 wherein said complex is present in an amount within the range of from about $10^{-5}$ molar to about $10^{-3}$ molar.

6. A saturable absorption media as defined in claim 4 wherein said electronically active solvent is an iodine-containing organic solvent.

7. A saturable absorption media as defined in claim 4 wherein said electronically active solvent is selected from the group consisting of iodomethane; iodoethane; 1-iodo-2-methylbutane; 1-iodoheptane; 1-iododecane; diiodomethane; pyridine; 4-methylpyridine; 2,5-dimethylpyridine; 3,4-dimethylpyridine; 4-tert-butylpyridine; quinoline; methyl sulfoxide; n-propyl sulfoxide; tetramethylene sulfoxide; ethyl sulfide; propylene sulfide; tetrahydrothiophene; phenyl sulfide; and 1-iodobutane.

8. In a method of producing infrared laser emission from a laser apparatus which includes an optical cavity, infrared lasing means positioned in said cavity, a pumping energy source operably coupled to said lasing means, and as a light control means a saturable absorption media having an absorption peak within the range of from about 700 nm to about 2500 nm and comprising a transition metal dithiene complex dissolved in a solvent for said complex, said light control means positioned within said cavity to control said emission, said method comprising the steps of pumping said infrared lasing means with said pumping energy source to obtain stimulated infrared emission, and controlling said stimulated emission with said light control means, the improvement which comprises using as said solvent an amount of an electronically active organic solvent for said complex sufficient to convert the infrared emission of said lasing means into a train of discrete, high-power, infrared pulses, each pulse having a duration of less than about 0.5 nanosecond, said electronically active organic solvent selected from the group consisting of an organic solvent containing an atom having an atomic weight greater than about 50, a sulfur atom-containing organic solvent, and an N-heterocyclic ring-containing organic solvent.

* * * * *